US011687352B2

(12) United States Patent
Sheoran et al.

(10) Patent No.: US 11,687,352 B2
(45) Date of Patent: *Jun. 27, 2023

(54) MACHINE-LEARNING MODELS APPLIED TO INTERACTION DATA FOR DETERMINING INTERACTION GOALS AND FACILITATING EXPERIENCE-BASED MODIFICATIONS TO INTERFACE ELEMENTS IN ONLINE ENVIRONMENTS

(71) Applicant: Adobe Inc., San Jose, CA (US)

(72) Inventors: Nikhil Sheoran, Chandigarh (IN); Nayan Raju Vysyaraju, Odisha (IN); Varun Srivastava, Maharashtra (IN); Nisheeth Golakiya, Gujarat (IN); Dhruv Singal, New Delhi (IN); Deepali Jain, Karnataka (IN); Atanu Sinha, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,889

(22) Filed: Jun. 17, 2021

(65) Prior Publication Data
US 2021/0311751 A1 Oct. 7, 2021

Related U.S. Application Data

(63) Continuation of application No. 16/576,310, filed on Sep. 19, 2019, now Pat. No. 11,068,285.

(51) Int. Cl.
*G06F 9/451* (2018.01)
*G06F 11/34* (2006.01)
(Continued)

(52) U.S. Cl.
CPC .............. *G06F 9/451* (2018.02); *G06F 3/048* (2013.01); *G06F 11/3438* (2013.01); *G06F 18/23* (2023.01); *G06N 20/00* (2019.01)

(58) Field of Classification Search
CPC ...... G06F 9/451; G06F 3/048; G06F 11/3438; G06K 9/6218; G06N 20/00
See application file for complete search history.

(56) References Cited

U.S. PATENT DOCUMENTS 10,467,307 B1   11/2019  Chanda et al.
2010/0107075 A1  4/2010  Hawthorne et al.
(Continued)

FOREIGN PATENT DOCUMENTS

KR   20120124891       11/2012
KR   20120124891 A  *  11/2012   ............. G06F 3/013

OTHER PUBLICATIONS

Tanwani et al, "Transfer in Inverse Reinforcement Learning for Multiple Strategies", Nov. 7, 2013, IEEE/RSJ, all pages (Year: 2013).*

(Continued)

*Primary Examiner* — Roberto Borja
(74) *Attorney, Agent, or Firm* — Kilpatrick Townsend & Stockton LLP

(57) ABSTRACT

A method includes identifying interaction data associated with user interactions with a user interface of an interactive computing environment. The method also includes computing goal clusters of the interaction data based on sequences of the user interactions and performing inverse reinforcement learning on the goal clusters to return rewards and policies. Further, the method includes computing likelihood values of additional sequences of user interactions falling within the goal clusters based on the policies corresponding to each of the goal clusters and assigning the additional sequences to the goal clusters with greatest likelihood values. Furthermore, the method includes computing interface experience metrics of the additional sequences using the rewards and the policies corresponding to the goal clusters of the additional sequences and transmitting the interface (Continued)

experience metrics to the online platform. The interface experience metrics are usable for changing arrangements of interface elements to improve the interface experience metrics.

20 Claims, 8 Drawing Sheets

(51) Int. Cl.
    *G06N 20/00*     (2019.01)
    *G06F 3/048*     (2013.01)
    *G06F 18/23*     (2023.01)

(56) References Cited

U.S. PATENT DOCUMENTS

| | | | |
|---|---|---|---|
| 2017/0193020 | A1 | 7/2017 | Yi et al. |
| 2018/0101391 | A1* | 4/2018 | Cunha .................. G06F 9/451 |
| 2018/0365025 | A1 | 12/2018 | Almecija et al. |
| 2019/0311279 | A1 | 10/2019 | Sinha et al. |
| 2020/0118145 | A1 | 4/2020 | Jain et al. |
| 2020/0273052 | A1* | 8/2020 | Ganti ................ G06Q 30/0204 |

OTHER PUBLICATIONS

Zhifei et al, "A Review of Inverse Reinforcement Learning Theory and Recent Advances", Jun. 15, 2012, IEEE CEC, all pages (Year: 2012).*

Jain et al., "Measurement of Users' Experience on Online Platforms from their Behavior Logs", Pacific-Asia Conference on Knowledge Discovery and Data Mining, Jun. 19, 2018, pp. 475-487.

Liu et al., "Patterns and Sequences: Interactive Exploration of Clickstreams to Understand Common Visitor Paths", Institute of Electrical and Electronics Engineers Transactions on Visualization and Computer Graphics, vol. 23, No. 1, Jan. 2017, pp. 321-330.

Ng et al., "Algorithms for Inverse Reinforcement Learning", Proceedings of the Seventeenth International Conference on Machine Learning, Computer Science Division, 2000, pp. 663-670.

Novak et al., "The Influence of Goal Directed and Experiential Activities on Online Flow Experiences", Journal of Consumer Psychology, vol. 13, No. 1-2, 2003, pp. 3-16.

Sutton et al., "Introduction to Reinforcement Learning", vol. 135, 1998, 3 pages.

Tanwani et al., "Transfer in Inverse Reinforcement Learning for Multiple Strategies", Institute of Electrical and Electronics Engineers/ RSJ International Conference on Intelligent Robots and Systems (IROS), Nov. 3-7, 2013, pp. 3244-3250.

Wang et al., "Modeling Action-level Satisfaction for Search Task Satisfaction Prediction", Proceedings of the 37th International Association for Computing Machinery Special Interest Group on Information Retrieval Conference on Research & Development in Information Retrieval, Jul. 2014, pp. 123-132.

Wang et al., "Unsupervised Clickstream Clustering for User Behavior Analysis", Proceedings of the CHI Conference on Human Factors in Computing Systems, May 7-12, 2016, pp. 225-236.

Zhang et al., "Data-driven Personas: Constructing Archetypal Users with Clickstreams and User Telemetry", Proceedings of the CHI Conference on Human Factors in Computing Systems, May 2016, pp. 5350-5359.

Zhifei et al., "A Review of Inverse Reinforcement Learning Theory and Recent Advances", Institute of Electrical and Electronics Engineers Congress on Evolutionary Computation, Jun. 15, 2012, 8 pages.

* cited by examiner

MACHINE-LEARNING MODELS APPLIED TO INTERACTION DATA FOR DETERMINING INTERACTION GOALS AND FACILITATING EXPERIENCE-BASED MODIFICATIONS TO INTERFACE ELEMENTS IN ONLINE ENVIRONMENTS

CROSS-REFERENCE TO RELATED APPLICATIONS

This application is a Continuation of U.S. application Ser. No. 16/576,310, filed Sep. 19, 2019, now allowed, the content of which is incorporated herein by reference.

TECHNICAL FIELD

This disclosure relates generally to machine-learning systems that facilitate modifying an interactive computing environment to enhance users' ability to interact with web-based applications and other electronic applications. More specifically, but not by way of limitation, this disclosure relates to applying machine-learning models to interaction data for identifying interaction goals associated with the interaction data and evaluating and, in some cases, performing experience-based modifications to interfaces for interacting with online environments.

BACKGROUND

Interactive computing environments, such as web-based applications or other online software platforms, allow users to perform various computer-implemented functions through graphical interfaces. A given interactive environment includes different graphical interfaces, each of which has a particular arrangement of available functionality or other content, that correspond to different states within the user environment. For instance, the interactive computing environment could have a first state in which a user device is presented with interface elements that search databases for different content items, a second state in which the user device is presented with interface elements that select the content items by storing them in a temporary memory location, and a third state in which the user device is presented with interface elements that cause a server to perform one or more operations on the combination of content items (e.g., creating a layered image, initiating a transaction to obtain a set of products, etc.).

Different users often have different experiences within the same type of interactive environment. For instance, different users having different levels of expertise with a particular application or online service may have varying levels of difficulty in reaching desirable interaction goals via the application or online service. Such interaction goals could include effectively performing desired functionality, efficiently locating desirable content, etc. Modifying the interactive environment of an online service to account for these different experiences could enhance the ability of any given user (or type of users) to utilize the online service as intended.

But existing solutions have limited capability to determine interaction goals of users of an interactive environment. Further, the inability to determine interaction goals of users contributes to determinations of inaccurate or irrelevant user experience metrics as they relate to the particular interaction goals. For instance, experience is latent in the minds of users, and is therefore difficult to measure directly. Although surveys could be used to evaluate different users' experience with respect to a particular interaction goal, these surveys could suffer from low response rates. And even the responses that are received simply identify what a user stated about his or her experience, which is an opinion colored by a user's subjective (and unreliable) memory, rather than analyzing interactions or series of interactions that actually occurred within the interactive environment. Furthermore, given a large number of variables with respect to an experience with an interactive environment (e.g., arrangement of content, layout of interface controls, etc.), simply surveying a user about his or her opinion is more likely to produce high-level assessments about aspects that the user can remember, rather than providing detailed, reliable insights as to how particular aspects of the interactive environment could be modified to better suit a user's needs.

SUMMARY

Certain embodiments involve applying machine-learning models to interaction data for determining interaction goals and evaluating and thereby modifying an interface for interacting with electronic content delivery systems. In one example, a method is used by an online platform to modify an interactive computing environment based on an interface experience metric. The method includes identifying, by a processor executing program code instructions, interaction data associated with user interactions with a user interface of the interactive computing environment. Further, the method includes computing, by a processor executing program code instructions, goal clusters of the interaction data based on sequences of the user interactions. The method also includes performing, by a processor executing program code instructions, inverse reinforcement learning on the goal clusters to return rewards and policies corresponding to each of the goal clusters. The method also includes computing, by a processor executing program code instructions, likelihood values of additional sequences of user interactions falling within the goal clusters based on the policies corresponding to each of the goal clusters. Additionally, the method includes assigning, by a processor executing program code instructions, the additional sequences to the goal clusters with greatest likelihood values. The method includes computing, by a processor executing program code instructions, interface experience metrics of the additional sequences using the rewards and the policies corresponding to the goal clusters of the additional sequences. Moreover, the method includes transmitting, by a processor executing program code instructions, the interface experience metrics to the online platform. The interface experience metrics are usable for changing arrangements of interface elements to improve the interface experience metrics.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
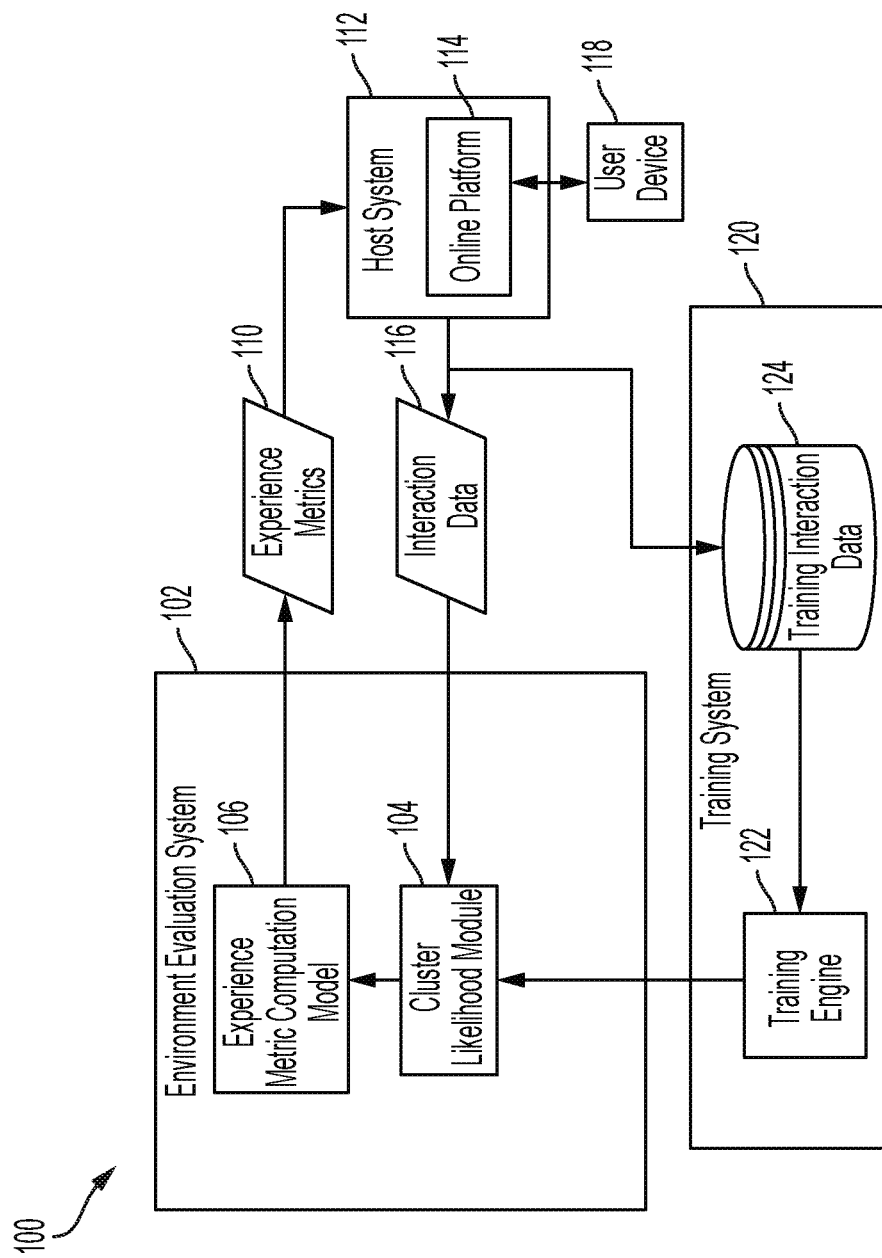
FIG. 1 depicts an example of a computing environment in which an online experience evaluation system can be used to evaluate and facilitate modifications to an interactive user experience in an online platform, according to certain embodiments of the present disclosure.

Certain embodiments involve applying machine-learning models to interaction data for determining interactive goals and evaluating experiences in interactive user experiences, which can facilitate modifying one or more interfaces for utilizing an interactive environment provided by electronic content delivery systems. For instance, an environment evaluation system identifies an interactive goal associated with a set of interaction data generated by an online content platform, and the environment evaluation system computes an interface experience metric from the interaction data based on the interactive goal. To do so, the environment evaluation system applies one or more machine-learning models to the interaction data and thereby computes the interface experience metric. In one example, the interface experience metric could indicate a poor user experience, such as a layout of interface elements increasing the difficulty of achieving the interactive goal within the online platform. The online platform can be customized to a user (or otherwise modified) based on the interface experience metric by, for example, modifying the layout of interface elements to reduce a particular user's level of difficulty with the software application (e.g., by hiding more expert-level features and increasing the prominence of novice-user features).

The following non-limiting example is provided to introduce certain embodiments. In this example, a training system and an environment evaluation system, which are included in or in communication with an online platform, execute one or more modeling algorithms that allow for enhancing interactive user experiences at the online platform. To do so, the training system accesses training interaction data from the online platform, where the training interaction data is generated by interactions that occur when user devices use one or more interfaces provided by the online platform and complete a user experience survey upon completion of their interaction with the online platform. The training system identifies the training interaction data with a survey experience metric that exceeds a user experience threshold such that the training system is able to perform training on interactive user experiences that were indicated by the user as being "positive." The training system also computes goal clusters of the training interaction data by performing a clustering operation on sequences of user interactions with the online platform and the time spent in each interaction state associated with each of the user interactions.

Upon generating the goal clusters, which are indicative of interactive goals of the users that are associated with the training interaction data, the training system performs an inverse reinforcement learning process on the goal clusters to return policies and rewards of each of the clusters. The inverse reinforcement learning process is a machine-learning technique used to generate and optimize values associated with policies and rewards of the interactive goal. In an example, the policy of a goal cluster characterizes behavior of actions of a user with respect to a goal identified by the goal cluster. For example, the policies provide an enumeration of a user's decision making when browsing an interactive website. In one example of a policy, while in a "View Product Details" state of a website, a user may have a probability of 0.1 of transition to a "Home" state and a probability of 0.5 of transitioning to a "Cart" state when the interaction goal is to purchase an item. Further, a reward associated with the policy and the interaction goal may be determined for each possible state transition to provide a metric for scoring a user experience based on the user's journey within the website. The policies and rewards of the clusters are provided to the environment evaluation system, which is used to generate the experience metrics for interaction data that is not associated with a completed survey (i.e., interaction data other than the identified training data).

The environment evaluation system computes a likelihood value of additional sequences of user interactions (e.g., interaction data) falling within each of the goal clusters determined by the training engine. That is, the environment evaluation system computes a likelihood of a representation of individual sequences of user interactions being clustered into a specific goal cluster. Each of the additional sequences of user interactions are assigned to a goal cluster that provides a greatest likelihood value for the additional sequences. For example, a sequence of user interactions is assigned to a "support" cluster when the likelihood value of the sequence of user interactions falling within the "support" cluster exceeds the likelihood value of all of the sequence of user interactions falling within the other identified clusters. In an example, the assignment to a specific cluster is indicative of the interactive goal of the sequence of user interactions.

Using the rewards and the policies of the assigned clusters, an experience metric computation model is able to determine an interface experience metric of a sequence of user interactions. The interface experience metric provides an estimation of a positive, a negative, or a neutral user experience that resulted in the sequences of user interactions. In some embodiments, providing the interface experience metric to systems that host online platforms can allow various interface elements of the interactive computing environment to be customized to particular users, modified to enhance the experience of certain types of users, or some combination thereof. In one example, an online tool may be configured with different modes for different types of users, such as a "guided" mode and an "expert" mode. The guided mode could include menus or other interface elements that present basic features more prominently than advanced features used by experts, could provide pop-up instructions for certain features, etc. One or more of the "guided" mode or the "expert" mode could be configured based on an interface experience metric. For instance, if the interface experience metric indicates that prominently featuring advanced tools in menus is more likely to diminish the experience of users in a "novice" group, the guided mode can hide or de-emphasize these problematic features for users in that group.

As described herein, certain embodiments provide improvements to interactive computing environments by solving problems that are specific to online platforms. These improvements include more effectively configuring the functionality of an interactive computing environment based on accurate and precise evaluations of user experience within the interactive computing environment. Facilitating these experience-based modifications involves identifying problematic or beneficial states of an interactive computing environment, which is particularly difficult in that the states of an interactive computing environment involve instantaneous transitions between different types of states (e.g., states corresponding to a combination of different content layouts, interface elements, etc.) that are traversed during a journey through the environment, where any given state may not last long from the perspective of the user. Thus, evaluating an experience within an interactive computing environment is uniquely difficult because these ephemeral, rapidly transitioning states could significantly impact a user's online experience even though any given state may not be memorable enough for a user to recall or evaluate after the fact (e.g., via a survey).

Because these user experience evaluation problems are specific to computing environments, embodiments described herein utilize machine-learning models and other automated models that are uniquely suited for assessing computing environments. For instance, a computing system automatically applies various rules of a particular type (e.g., various functions captured in one or more models) to clickstream data or other interaction data and thereby determines interactive goals of the user and computes objective measurements of online experience based on the interactive goals, sometimes in a real-time manner. The measurements are objective at least because a computing system applies these rules in an automated manner, rather than relying on subject memories and judgments. The objective measurements are usable for enhancing a computing environment by, for example, modifying interface elements or other interactive aspects of the environment. Using one or more models described herein can therefore allow for a more accurate and precise evaluation of which states of an interactive environment are more likely to help or hinder an intended outcome of using the online platform. Consequently, certain embodiments more effectively facilitate modifications to a computing environment that facilitate desired functionality, as compared to existing systems.

As used herein, the term "online platform" is used to refer to an interactive computing environment, hosted by one or more servers, that includes various interface elements with which user devices interact. For example, clicking or otherwise interacting with one or more interface elements during a session causes the online platform to manipulate electronic content, query electronic content, or otherwise interact with electronic content that is accessible via the online platform.

As used herein, the term "interface element" is used to refer to a control element in a graphical user interface that performs, in response to an interaction from a user device, one or more operations that change a state of an interactive computing environment. Examples of changing the state of an interactive computing environment include selecting a function from a menu interface element, entering query terms in a field interface element used for searching content, etc.

As used herein, the term "interaction data" is used to refer to data generated by one or more user devices interacting with an online platform that describes how the user devices interact with the online platform. An example of interaction data is clickstream data. Clickstream data can include one or more data strings that describe or otherwise indicate data describing which interface features of an online service were "clicked" or otherwise accessed during a session. Examples of clickstream data include any consumer interactions on a website, consumer interactions within a local software program of a computing device, information from generating a user profile on a website or within a local software program, or any other consumer activity performed in a traceable manner. Another example of interaction data includes system-to-system interactions between a user device and server hosting an online platform (e.g., data describing transmission of network addresses, establishing communications, API calls, etc.).

As used herein, the term "interaction goal" is used to refer to a goal of the user in generating the interaction data when interacting with the online platform. An example of an interaction goal is purchasing a product, locating product support information, viewing product details, etc.

As used herein, the term "interface experience metric" is used to refer to data describing or otherwise indicating a quality of an interactive user experience in the online platform based on the user's interactive goal.

As used herein, the term "click state" is used to refer to a state of an interactive computing environment as of a particular click or other interaction with an interface element. For instance, a click or other interaction that submits a query causes query results to be displayed with an interactive computing environment. The click state, in this example, is the display of query results resulting from the query-submission click.

As used herein, the term "next state" is used to refer to a state that is available within the online platform following a particular click state. In the example above, a click state that includes displaying query results can have a first next state that includes clicking one of the results, a second next state that includes inserting additional query parameters, a third next state that includes clicking a "back" button to return to the original query screen, etc.

As used herein, the term "experience valuation model" is used to refer to program code that implements one or more algorithms for computing an interface experience metric. The algorithms include one or more functions with tunable parameters that, when applied to a set of interaction data and an interaction goal, compute an interface experience metric for an interactive computing environment.

Referring now to the drawings, FIG. 1 depicts an example of computing environment 100 in which an environment evaluation system 102 evaluates and, in some cases, facilitates modifications to an interactive user experience in an online platform 114 provided by a host system 112. In various embodiments, the computing environment 100 includes one or more of the environment evaluation system 102, the host system 112, and a training system 120. The environment evaluation system 102 applies a cluster likelihood module 104 to interaction data 116 generated by interactions between the online platform 114 and a user device 118. In an example, the cluster likelihood module 104 identifies a goal cluster in which the sequences of user interactions of the interaction data 116 are assigned. In an example, the goal clusters, which are generated by the training system 120, are representative of interaction goals of a user with the online platform 114 when generating a sequence of user interactions.

An experience metric computation model 106 is applied to the goal cluster assigned interaction data 116 that is generated by the cluster likelihood module 104. Applying the experience metric computation model 106 to the goal cluster assigned interaction data 116 computes one or more experience metrics 110 that indicate a quality of the interactive user experience in the online platform 114. Because the environment evaluation system 102 applies these models and modules in an automated manner based on observable data (e.g., clickstream data), the resulting experience metrics 110 provide objective measures of the quality of a particular experience within an online computing environment.

The environment evaluation system 102 provides the experience metrics 110 to the host system 112. In some embodiments, providing the experience metrics 110 to the host system 112 causes one or more features of the online platform to be changed such that subsequent interactive user experiences are enhanced for various user devices 118.

In an example, the environment evaluation system 102 receives the interaction data 116 that is generated by one or more user devices 118 interacting with the online platform 114. An example of interaction data 116 is clickstream data. Clickstream data can include one or more data strings that describe or otherwise indicate data describing which interface features of an online service were "clicked" or otherwise accessed during a session. Examples of clickstream data include any consumer interactions on a website, consumer interactions within a local software program of a computing device, information from generating a user profile on a website or within a local software program, or any other consumer activity performed in a traceable manner. Another example of interaction data 116 includes system-to-system interactions between the user device 118 and a host system 112 that may not involve user input (e.g., sending network addresses, establishing communications, API calls, etc.). Another example of interaction data 116 includes a user identifier generated through interactions between the user device 118 and an online platform 114 of the host system 112.

In some embodiments, the host system 112 could include one or more servers that log user activity in the online platform 114 and transmit the interaction data 116 describing the logged activity to the environment evaluation system 102. In additional or alternative embodiments, a user device 118 could execute one or more services (e.g., a background application) that log user activity in the online platform 114 and transmit, to the environment evaluation system 102, the interaction data 116 describing the logged activity.

In these various embodiments, logging the user activity includes, for example, creating records that identify a user entity (e.g., the user device 118 or a credential used to access the online platform 114), timestamps for various interactions that occur over one or more sessions with the online platform 114, and event identifiers that characterize the interaction. Examples of event identifiers include an identifier of a particular interface element that was clicked or otherwise used, an identifier of a particular group of interface elements to which an interface element that was clicked or otherwise used belongs, etc.

In some embodiments, the interaction data 116 includes multiple journeys or sequences of user interactions, where a journey or sequence of user interactions includes a set of clicks over one or more sessions within the online platform 114. A given click can be mapped to a given type of event described above. For instance, a click directed to a particular interface element or a member of a group of interface elements can be classified as a particular event for that interface element or group of interface elements. A journey of interface experiences may represent a discrete path of click states, corresponding states, and time spent in the corresponding states when the user device 118 interacts with the online platform 114. For a non-limiting example, a particular user could utilize the user device 118 to create a journey which includes various events, such as clicking on a particular portion of content, expanding detailed information on the portion of content, clicking on a search function, and clicking to close the session with the online platform 114.

In some embodiments, the experience metric computation model 106 computes one or more experience metrics 110 from the interaction data 116 by executing code that performs various operations based on reward functions and policies associated with the interaction goals of the journeys or sequences of user interactions. To compute the experience metrics 110, the experience metric computation model 106 applies an experience valuation model to the policies and rewards associated with the interaction goal and the interaction data 116. In one example, the experience valuation model computes or otherwise identifies base values for various states of the interactive user experience from the online platform 114. In some embodiments, a base value indicates a baseline quality of the interactive user experience associated with a particular click state, without regard to prior or subsequent click states.

Applying the experience valuation model 106 can include computing value differentials between a current click state and various other click states available in the online platform. For instance, a value differential, which could be the difference in the base value of a current click state and a potential next click state, is a data point that indicates whether a transition from the current click state to the potential next click state would increase the quality of a user's experience in an online platform (e.g., because the potential next click state has a higher base value) or decrease the quality of a user's experience in an online platform (e.g., because the potential next click state has a lower base value). In a simplified example, for a given pair of value differentials that involves a respective pair of state transitions, a first value differential being different from a second value differential could indicate that an interface experience involving the first transition between states has a difference in quality (e.g., better or worse end-user experience) than an interface experience involving the second transition between states. In various use cases, a set of value differentials can indicate qualities of experience that are higher or that otherwise indicate a better user experience, qualities of experience that are lower or that otherwise indicate a worse user experience, qualities of experience that are the same or that otherwise indicate a similar user experience, or some combination thereof. The experience metric computation model 106 computes a given interface experience metric, to be included in the experience metrics 110, from a combination of these various value differentials and the probabilities obtained from next state probability data. In some embodiments, additional factors can be included in this computation, as described in detail herein.

In another example, the experience metrics 110 are determined by combining a recurrent neural network (RNN) with a value elicitation from the sequences of user interactions. The RNN processes the sequential inputs with hidden units to store history of past events. The user experience metrics 110 are then determined using model-based or model free approaches by drawing from Reinforcement Learning (RL) algorithms (i.e., processes) that compute experience metrics, experience scores, or both based on rewards and policies associated with identified interaction goals of the sequences of user interactions. In an example, a model-based value iteration approach is used. In particular, the user experience metrics 110 may be determined from transition probabilities associated with sequences of user interactions and using an RL approach. In another example, a model-free approach may be used to determine the user experience metrics 110. In such an example, the user experience metrics 110 may be determined directly from the behavior information using another variant of the RL approach by observing the current estimate instead of determining transition probabilities.

The environment evaluation system 102 is trained with a training system 120. The training system 120 includes one or more computing devices that executes one or more training engines 122. A training engine 122 uses training interaction data 124 to train one or more models. The training engine 122 provides data to the environment evaluation system 102 including reward functions and policies associated with the goal clusters generated from the training interaction data 124. The training interaction data 124 could be, for example, historical interaction data generated in the same manner as the interaction data 116. In some embodiments, the training interaction data 124 includes survey data completed by the users generating the training interaction data 124. The survey data provides an indication of a user experience of the user while interacting with the online platform 114 to generate the training interaction data 124. The training engine 122 trains the environment evaluation system 102 using the training interaction data 124 with indications of user experiences that exceed a threshold. For example, the training engine 122 may only accept the training interaction data 124 with a user experience rating indicating a positive user experience. Based on the training interaction data 124 that indicates a positive user experience, the training engine 122 is able to generate goal clusters and rewards and policies associated with the goal clusters. The rewards and policies associated with the goal clusters are used by the environment evaluation system 102 to generate the experience metrics 110 associated with the interaction data 116, as discussed above.

The environment evaluation system 102 may transmit the experience metrics 110 to the host system 112. In some embodiments, doing so causes the host system 112 to modify an interactive user experience of the online platform 114 based on the experience metrics 110. In one example, a development platform could rearrange the layout of an interface so that features or content associated with higher-quality experience metrics 110 are presented more prominently, features or content associated with lower-quality experience metrics 110 are presented less prominently, or some combination thereof. In various embodiments, the development platform performs these modifications automatically based on an analysis of the experience metrics 110, manually based on user inputs that occur subsequent to presenting the experience metrics 110, or some combination thereof.

In some embodiments, modifying one or more interface elements is performed in real time, i.e., during a session between the online platform 114 and the user device 118. For instance, an online platform 114 may include different modes, in which a first type of interactive user experience (e.g., placement of menu functions, hiding or displaying content, etc.) is presented to a first type of user group and a second type of interactive user experience is presented to a second type of user group. If, during a session, an interface experience metric is computed that indicates that operating in the first mode for a particular user is causing an undesirable experience, the online platform 114 could switch to the second mode in an effort to improve the user experience. The environment evaluation system 102 can continue to evaluate the online experience during the session and thereby determine if additional changes to the interactive computing environment are warranted. In other embodiments, the interactive computing environment is modified after a given session is complete and the interface experience metric computed for the session is transmitted to the host system 112.

One or more computing devices are used to implement the environment evaluation system 102 and the host system 112. For instance, the environment evaluation system 102, the host system 112, or both could include a single computing device, a group of servers or other computing devices arranged in a distributed computing architecture, etc.

The online platform 114 can be any suitable online service for interactions with the user device 118. Examples of an online platform include a content creation service, an electronic service for entering into transactions (e.g., searching for and purchasing products for sale), a query system, etc. In some embodiments, one or more host systems 112 are third-party systems that operate independently of the environment evaluation system 102 (e.g., being operated by different entities, accessible via different network domains, etc.). In additional or alternative embodiments, one or more host systems 112 include an environment evaluation system 102 as part of a common computing system.

The user device 140 may be any device which is capable of accessing an online service. For non-limiting examples, user device 140 may be a smart phone, smart wearable, laptop computer, desktop computer, or other type of user device.

Figure 2:
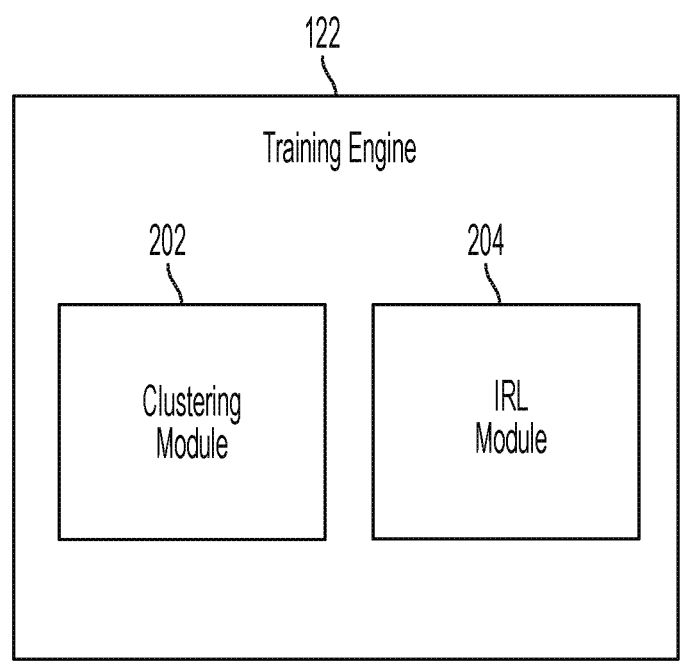
FIG. 2 depicts an example of a training engine of the computing environment of FIG. 1, according to certain embodiments of the present disclosure.

FIG. 2 depicts an example of the training engine 122 of the computing environment 100, according to certain embodiments of the present disclosure. As discussed above, the training engine 122 receives the training interaction data 124 generated at the online platform 114. The training interaction data 124 includes survey data indicating user experience ratings provided by users of the online platform 114 upon completion of a sequence of interactions with the online platform 114. The training interaction data 124 may be filtered such that the training engine 122 trains the models of the environment evaluation system 102 using only the training interaction data 124 associated with a positive user experience. For example, if the experience ratings of the survey data are on a scale from 1-10, the training engine 122 may only train the models using the training interaction data 124 with experience ratings of 8 or greater.

A clustering module 202 of the training engine 122 receives the training interaction data 124 used in the training process that exceeds the experience ratings threshold of the survey data associated with the training interaction data 124. The clustering module 202 subjects an n-gram based clustering on the training interaction data 124. In an example, the training interaction data 124 includes time spent in each state following a user interaction with the online platform 114 (e.g., in response to a click action). This timing information may be incorporated into the n-gram based clustering. The result of the n-gram based clustering operation is a group of goal clusters where the individual sequences of user experiences provided by the training interaction data 124 are grouped into the various goal clusters. In an example, the sequences of user experiences within each goal cluster are determined to have the same interactive goal. In another example, any other suitable clustering operation may be used in place of the n-gram based clustering.

An n-gram for a sequence of click-actions S of a length l may be depicted by the following equation:

$$G_n(S)=\{(s_j,s_{j+1},\ldots,s_{j+n-1})\}, j\in[1,l+1-n] \quad \text{(Equation 1)}$$

where $s_j$ is the jth state of the sequence of click-actions. To include time-spent on a particular action by a user, the time-spent on a particular action (e.g., obtained on a basis of hit-time differences) is discretized into blocks and included as part of the n-gram. Thus, in an example, the n-gram is further defined as the following equation:

$$G_n(S)=\{(s_j,t_j,s_{j+1},t_{j+1},\ldots,s_{j+n-1})\}, j\in[1,l+1-n] \quad \text{(Equation 2)}$$

where $s_j$ and $t_j$ are the jth state and the time-spent on the jth state, respectively. Labels for each of the goal clusters identified by the n-gram clustering operation are identified by a dominant n-gram of the cluster. For example, a goal cluster may be labeled as a "Support Cluster" when the dominant n-gram of the goal cluster is a "Support" action of the online platform 114.

Once the training interaction data 124 is clustered, an inverse reinforcement learning (IRL) module 204 is used to obtain reward functions and policies for each of the identified goal clusters using the highly rated training interaction data 124. Thus, a set of policies and rewards corresponding to each of the goals identified by the goal clusters are generated. In an example, if C is a set of categories of webpages, then an Action Space $A_c$ is defined as the actions available while at a state c when the state c is an element of the set of categories C. A policy map is defined as any map π from state spaces to probabilities over actions. Further, the state spaces contain a representation of action history as well as a current action. A value function for a policy π is provided by the following equation:

$$V^\pi(s_0)=E[R(s_1)+\gamma R(s_2)+\gamma^2 R(s_3)+\ldots|\pi] \quad \text{(Equation 3)}$$

where E[*] is the expectation operator, R(*) is the reward function associated with a given state, and γ is a discount factor that determines how much weight each reward R receives in the value function. Equation 3 represents the value function for the policy π over a distribution of state sequences passed through when executing the policy π starting from the state $s_1$.

The reward function of Equation 3 is formulated as a linear combination of several bounded basis functions of the state s. For example, the reward function may be represented by the following equation:

$$R(s)=\alpha_1\varphi_1(s)+\alpha_2\varphi_2(s)+\ldots+\alpha_d\varphi_d(s) \quad \text{(Equation 4)}$$

where $\alpha_i$ is a trainable parameter found by the inverse reinforcement learning algorithm and $\varphi_i(s)$ is a mapping from the set of states S to the set of rewards, which are components of a feature vector $\Phi(s)$. The feature vector $\Phi(s)$ of a states is a concatenation of an |S|-length one-hot vector, which represents the state s, and additional features of that state such as average time spent, incoming entropy, outgoing entropy, self-hops, etc.

The trainable parameters $\alpha_i$ of Equation 4 may be determined by solving a linear programing problem represented by the following equation:

$$\max \Sigma_{i=1}^k p(\hat{V}^{\pi*}(s_0)-\hat{V}^{\pi^j}(s_0))$$

$$\text{s.t. } |\alpha_i|\leq 1, i=1,\ldots,d \quad \text{(Equation 5)}$$

where p(x)=x if x≥0 and p(x)=2x if x<0, such that violations of the constraints are penalized. In each iteration, a new set of $\alpha_i$ values are obtained resulting in a new reward function. A policy $\pi_{k+1}$ is then found that maximizes $V^\pi(s_0)$ under R and added to the current set of policies. This process is repeated for a large number of iterations until the value of the optimization objective converges. In this manner, the training engine 122 is able to generate the reward values and the policies for each of the goal clusters one at a time, and to provide the reward values and the policies to the experience metric computation model 106.

After obtaining the policies and rewards for the goal clusters, the environment evaluation system 102 evaluates a likelihood of individual sequences of user interactions provided in the interaction data 116 falling within a particular goal cluster using the cluster likelihood model 104. The likelihood is determined using a log-likelihood of a click-stream sequence S={$s_1, s_2, \ldots, s_N$} under a policy π using the following equation:

$$\log P(S|\pi)=\Sigma_{i=1}^{N-1} \log \pi(s_{i+1}|s_i) \quad \text{(Equation 6)}$$

After calculating the log-likelihood of each individual sequence of user interactions for each goal cluster, the individual sequences of user interactions are assigned to the goal clusters that provide a maximum log-likelihood. Assigning the sequences of user interactions to a goal cluster provides an indication of a likely goal for the sequence of interactions and also provides an indication of rewards and policies for the sequences of user interactions.

Figure 3:
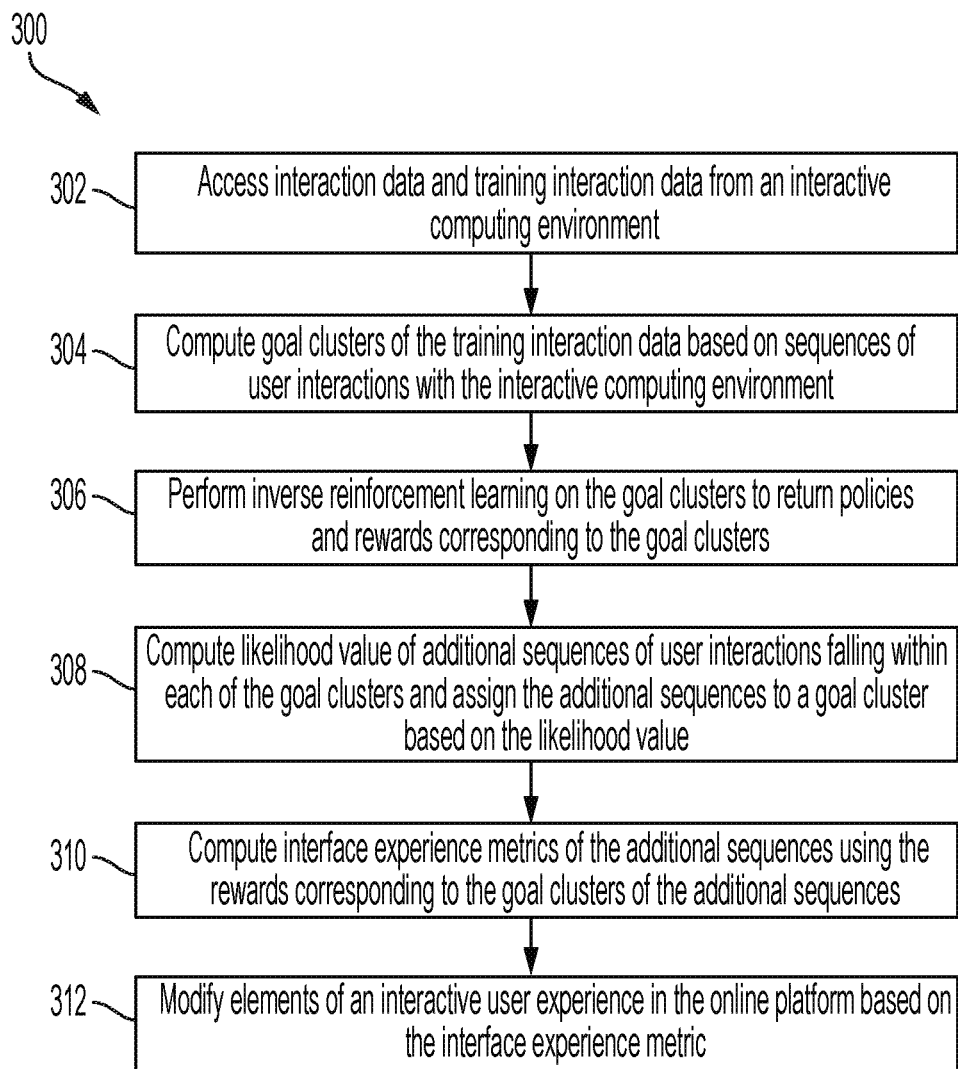
FIG. 3 depicts an example of a process for facilitating the modification of an interactive user experience based on a user interaction goal and one or more interface experience metrics, according to certain embodiments of the present disclosure.

FIG. 3 depicts an example of a process 300 for facilitating the modification of an interactive user experience based on one or more interface experience metrics, according to certain embodiments of the present disclosure. One or more computing devices (e.g., the computing environment 100) implement operations depicted in FIG. 3 by executing suitable program code. For illustrative purposes, the process 300 is described with reference to certain examples depicted in the figures. Other implementations, however, are possible.

At block 302, the process 300 involves accessing interaction data from an interactive computing environment, such as the online platform 114. For instance, interactions between the user device 118 and the online platform 114 may create the interaction data 116. The environment evaluation system 102 accesses interaction data 116 from a suitable non-transitory computer-readable medium or other memory device. In some embodiments, interaction data 116 is stored on one or more non-transitory computer-readable media within host system 112. The environment evaluation system 102 accesses the interaction data 116 via suitable communications with a host system 112 (e.g., a push or batch transmission from the host system 112, a pull operation from the environment evaluation system 102, etc.). In additional or alternative embodiments, the environment evaluation system 102 and the host system 112 are communicatively coupled to a common data store (e.g., a set of non-transitory computer-readable media, a storage area network, etc.). The environment evaluation system 102 retrieves the interaction data 116 from the data store after the host system 112 stores the interaction data 116 in the data store. In additional or alternative embodiments, interaction data 116 is stored at user devices 118 and transmitted to the environment evaluation system 102 directly, without involving the host system 112. For instance, a background application on each user device 118 could transmit a set of interaction data 116 for that user device 118 to the environment evaluation system 102.

The interaction data 116, in some examples, also includes the training interaction data 124. As discussed above, the training interaction data 124 includes the sequences of user interactions and survey data providing an indication of a user experience rating. The training interaction data 124 may be limited to the sequences of user interactions with positive user experience ratings.

At block 304, the process 300 involves computing goal clusters of the training interaction data 124 using the clustering module 202. The goal clusters may be computed using an n-gram clustering process based on the sequences of user interactions from the training interaction data 124 that were given positive user experience ratings by a survey. Each of the goal clusters generated by the clustering module 202 may be labeled with a "goal" based on the dominant n-grams of the goal clusters.

At block 306, the process 300 involves performing inverse reinforcement learning on the goal clusters, using the IRL module 204. Performing the inverse reinforcement learning on the goal clusters returns policies and rewards corresponding to the individual goal clusters. For example, when a user interacts with the online platform 114, the clustering of a sequence of user interactions identifies the goal of the user during the interaction with the online platform 114 that generated the sequence of user interactions. Rewards and policies identified by the IRL module 204 for each goal cluster may differ based on the goals associated with the goal clusters.

At block 308, the process 300 involves determining a likelihood value of additional sequences of user interactions in the user interaction data 116 falling within each of the goal clusters. The sequences of user interactions may each be assigned to a goal associated with a goal cluster based on the likelihood of the sequences of user interactions falling within the goal cluster. For example, a sequence of user interactions that is most likely to be assigned to a "Support" goal cluster will be assigned to the "Support" goal.

At block 310, the process 300 involves computing an interface experience metric 110 for each sequence of user interactions included in the interaction data 116. For instance, the environment evaluation system 102 may apply an experience metric computation model to the interaction data 116 to compute the interface experience metric. In some embodiments, the environment evaluation system 102 uses the rewards and the policies determined by the training engine 122 for each goal to generate the user experience metric 110. The interface experience metrics 110 for the sequences of user interactions can indicate whether an end user had a positive, a negative, or a neutral experience when generating the sequences of user interactions.

At block 312, the process 300 involves modifying interface elements of an interactive user experience in the online platform 114 based on the interface experience metrics 110. For instance, the host system 112 includes one or more computing devices that can modify interface elements of the online platform 114 based on the received experience metrics 110. In one example, an interface element may include, but is not limited to, visual content, such as colors and layout, available click actions in certain click states, and design features, such as menus, search functions, and other elements. In some embodiments, the interface elements may be modified in a particular manner when lower user experience metrics 110 are received. In other embodiments, the interface elements may be modified in a different particular manner when higher user experience metrics 110 are received. The interface elements may be modified in any suitable manner including, but not limited to, the examples discussed above with respect to FIG. 1. Further, as part of the modification, the online platform 114 may provide messages to the user requesting feedback or providing the user with offers to try additional products associated with the online platform 114 at a free or reduced cost in response to a negative interactive user experience. Similar messages may be provided to a user with a positive interactive user experience to prompt the user to continue using a product associated with the online platform 114.

Figure 4:
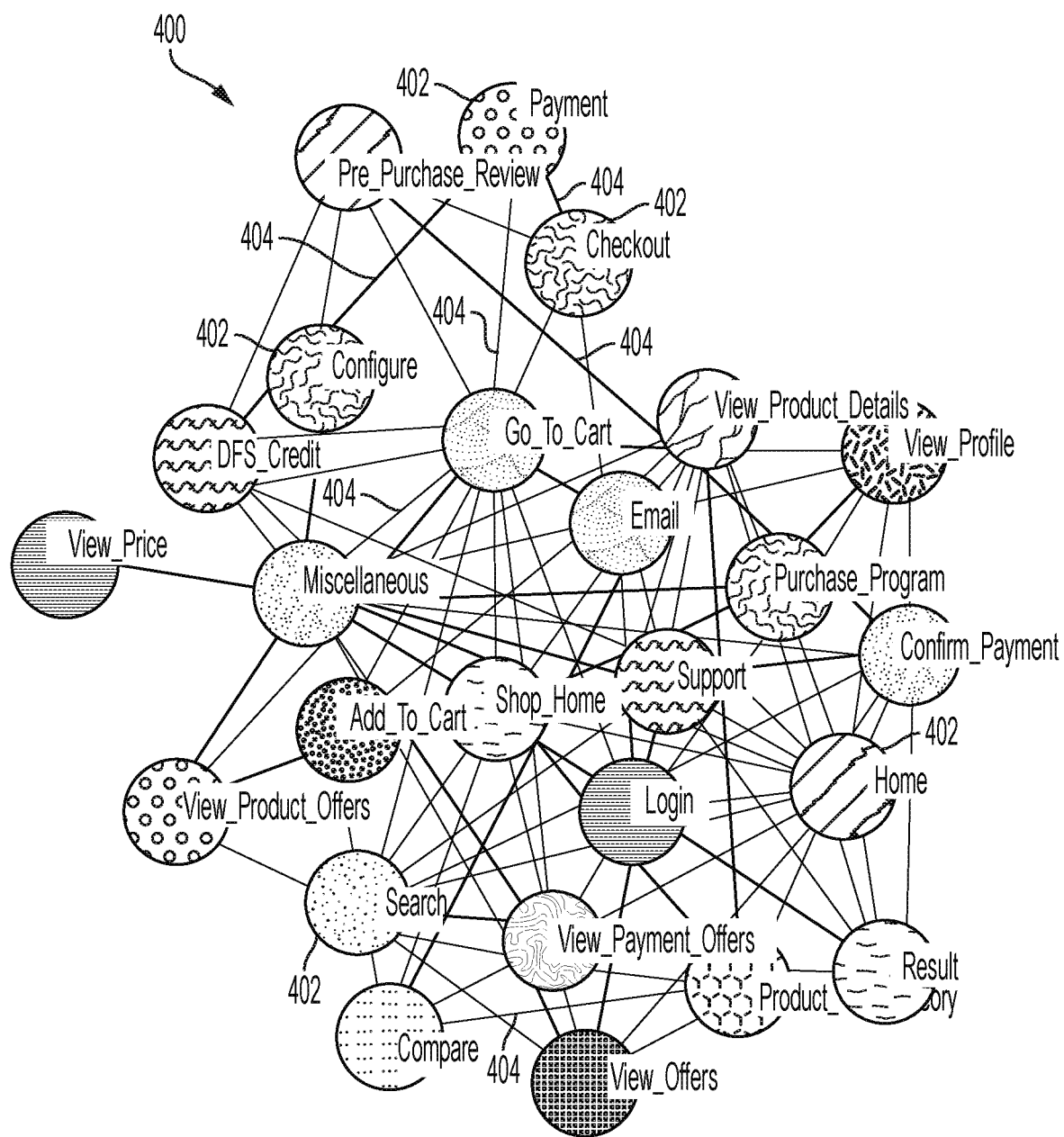
FIG. 4 depicts an example of a website structure used in the computing environment of FIG. 1, according to certain embodiments of the present disclosure.

FIG. 4 depicts an example of a website structure 400 used in the online platform 114, according to certain embodiments of the present disclosure. As illustrated, the website structure 400 includes representations of states 402 of the website structure 400. For example, the states 402 can include pages, click actions, or other interaction elements within a website that enable transition of the online platform 114 from one state 402 of a website or program to a subsequent state 402 of the website or program.

Also depicted in the website structure 400 are connections 404 between the states 402. For example, each state 402 includes a series of connections 404 extending to different states 402 of the website structure 400. The connections 404 indicate each of the paths that a user can travel from a particular state 402 to another state 402. For example, the state 402 titled "Payment" may be connected, via connections 404, to each of the states 402 titled "Configure," "Checkout," and "Go_To_Cart." Thus, the state 402 titled "Payment" is capable of transitioning to the three connected states 402 using a single user interaction such as a click on an interactive element within the website. Sequences of user interactions that generate the interaction data 116 and the training interaction data 124 may include a sequence of the states 402 traversed by a user and a time spent within each of the states 402 along the sequence.

Figure 5:
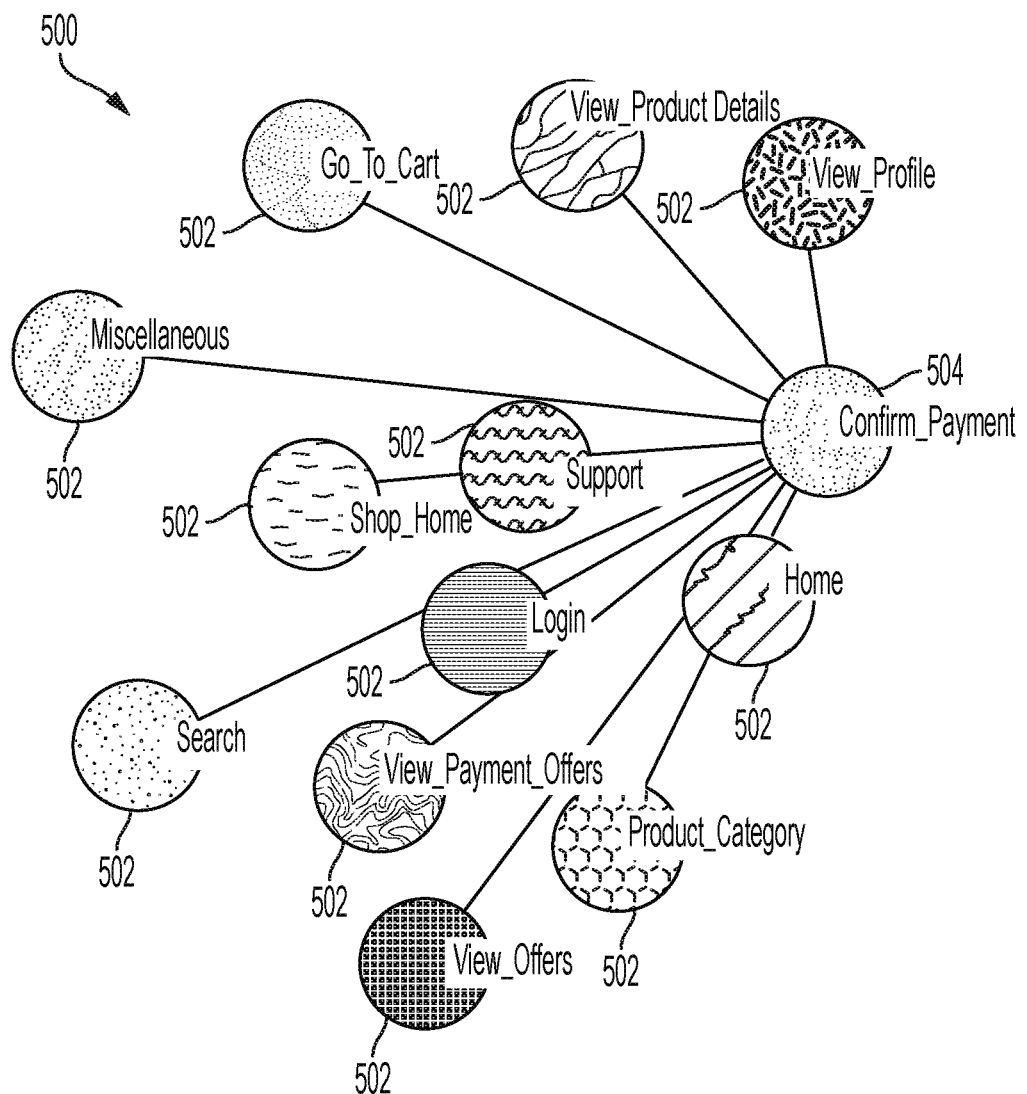
FIG. 5 depicts an example an example of a subset of the website structure of FIG. 4, according to certain embodiments of the present disclosure.

FIG. 5 depicts an example of a subset 500 of the website structure 400 including incoming states 502 to a particular state 504, according to certain embodiments of the present disclosure. In an example where the interaction goal of a sequence of user interactions within the online platform 114 is the "Purchase" of an item, the action or page name that shows that the goal has been reached may be "Confirm_Payment." Each of the incoming states 502 to the particular state 504 associated with the interaction goal may generate rewards in the reward function greater than the other states 402 (e.g., as shown in FIG. 4) not directly connected to the particular state 504. For example, proximity of a state 402 or 502 to the particular state 504 associated with the interaction goal influences the reward value of the state 402 or 502.

Reaching one of the incoming states 502 in a sequence of user interactions may result in an experience metric 110 indicating a positive user experience even when the particular state 504 associated with the interaction goal is not reached. For example, a user may reach the state 502 titled "Go_To_Cart" but decide not to complete the purchase at the particular state 504 associated with the interaction goal due to the user deciding not to actually buy an item. The sequence of user interactions to reach the "Go_To_Cart" state 502 may still have been a positive user experience if the sequence of user interactions indicates minimal or no trouble in reaching the "Go_To_Cart" state 502 despite not completing the purchase at the particular state 504.

Figure 6:
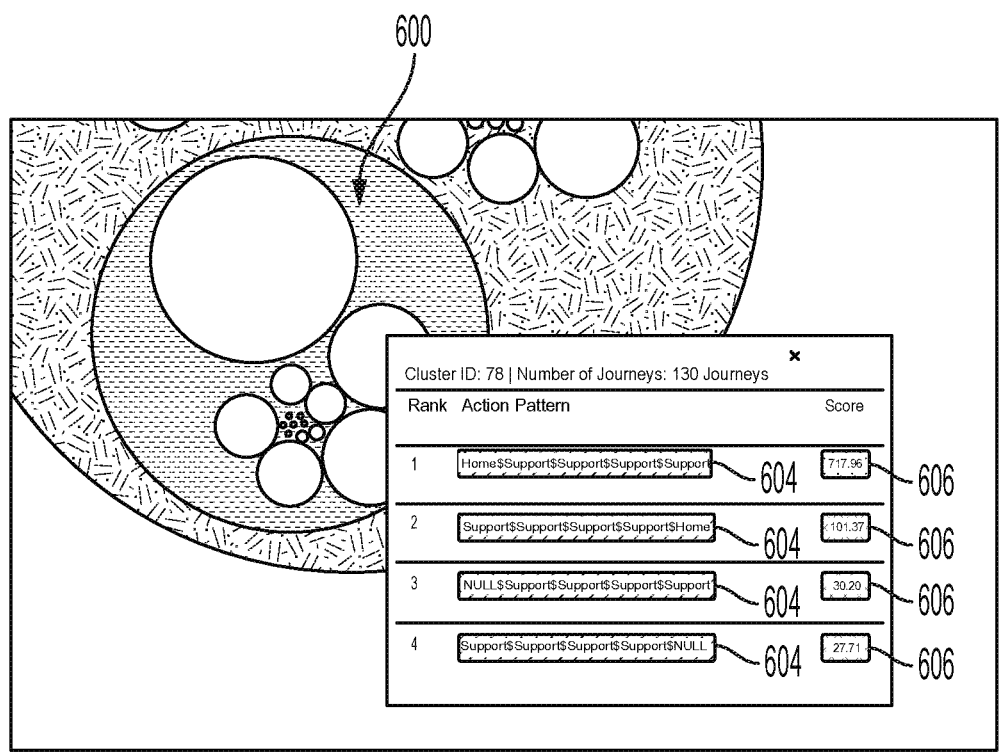
FIG. 6 depicts an example of a goal cluster identified based on user interactions with an online platform associated with the website structure of FIG. 4, according to certain embodiments of the present disclosure.

FIG. 6 depicts an example of a goal cluster 600 identified based on user interactions with the online platform 114 associated with the website structure 400, according to certain embodiments of the present disclosure. The goal cluster 600 may be generated by the training engine 122 based on the training interaction data 124. For example, the training engine 122 may perform an n-gram clustering algorithm on the training interaction data 124 to generate the goal cluster 600. As illustrated, the goal cluster 600 is generated to cluster representations of sequences of user interactions with the goal of seeking information about "Support" from the online platform 114. For example, a user may wish to find support information about an issue with a particular product sold or otherwise associated with the online platform 114.

A series of action patterns 604 (e.g., sequences of user interactions) associated with the sequences of user interactions are depicted that are clustered into the goal cluster 600. In an example, scores 606 generated by the n-gram clustering algorithm indicate the relevance of each of the action patterns 604 to the goal cluster 600. For example, the goal cluster 600 that transitions from a "Home" state 402 to a series of "Support" states 402 generates a greatest relevance to the goal cluster 600, as indicated by the scores 606.

Figure 7:
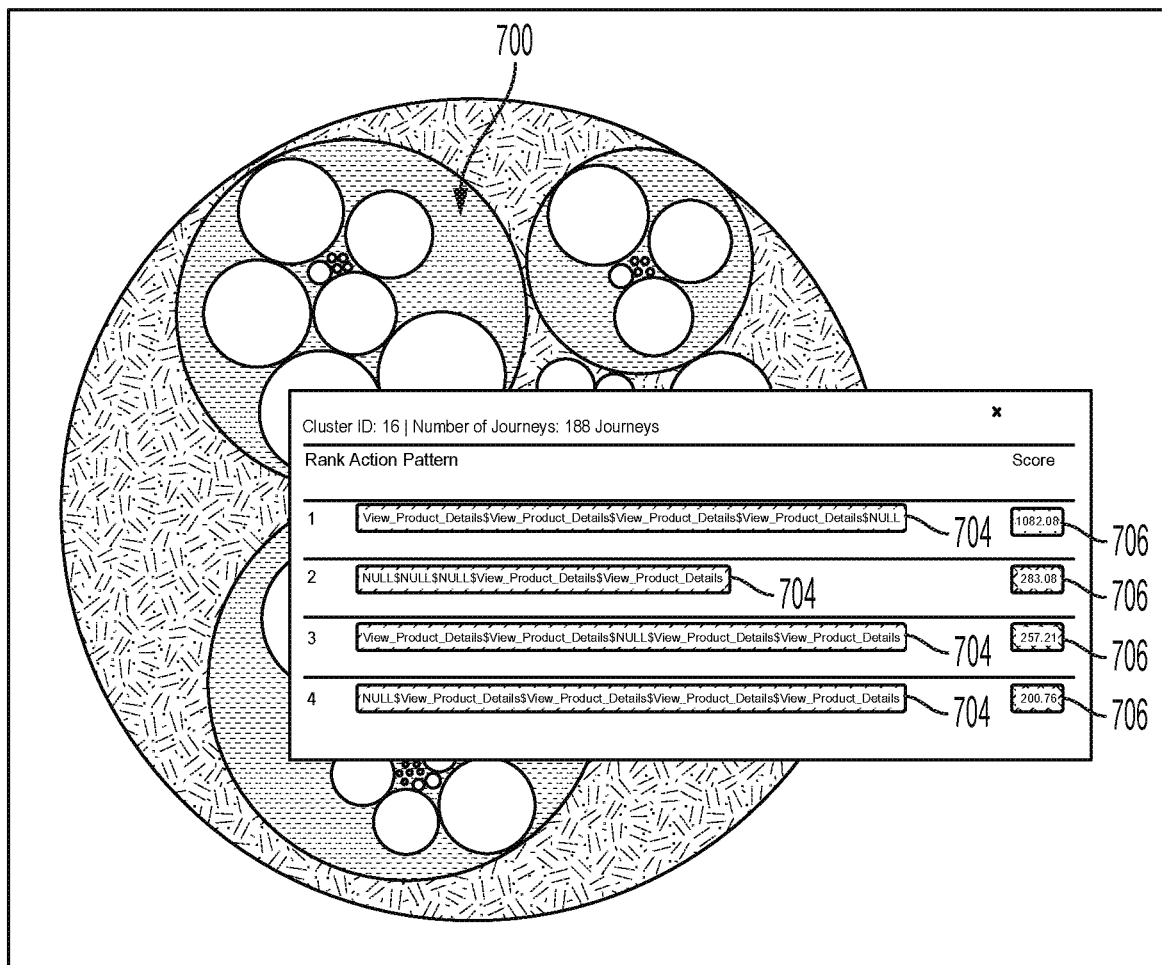
FIG. 7 depicts an example of an additional goal cluster identified based on user interactions with an online platform associated with the website structure of FIG. 4.

FIG. 7 depicts an example of an additional goal cluster 700 identified based on user interactions with the online platform 114 associated with the website structure 400, according to certain embodiments of the present disclosure. The goal cluster 700 may be generated by the training engine 122 based on the training interaction data 124. For example, the training engine 122 may perform an n-gram clustering algorithm on the training interaction data 124 to generate the goal cluster 700. As illustrated, the goal cluster 700 is generated to cluster representations of sequences of user interactions with the goal of seeking information about "Product Details" from the online platform 114. For example, a user may wish to find product details about a particular product sold or otherwise associated with the online platform 114.

A series of action patterns 704 (e.g., sequences of user interactions) associated with the sequences of user interactions are depicted that are clustered into the goal cluster 700. In an example, scores 706 generated by the n-gram clustering algorithm indicate the relevance of each of the action patterns 704 to the goal cluster 700. For example, the goal cluster 700 that maintains a "View_Product_Details" state 402 generates a greatest relevance to the goal cluster 700, as indicated by the scores 706. As discussed above with respect to FIGS. 2 and 3, once the goal clusters 600 and 700 are established for the training interaction data 124, an inverse reinforcement learning process is performed on the goal clusters 600 and 700 to identify rewards and policies associated with the determined interaction goals of the user.

Example of a Computing System for Implementing Certain Embodiments

Figure 8:
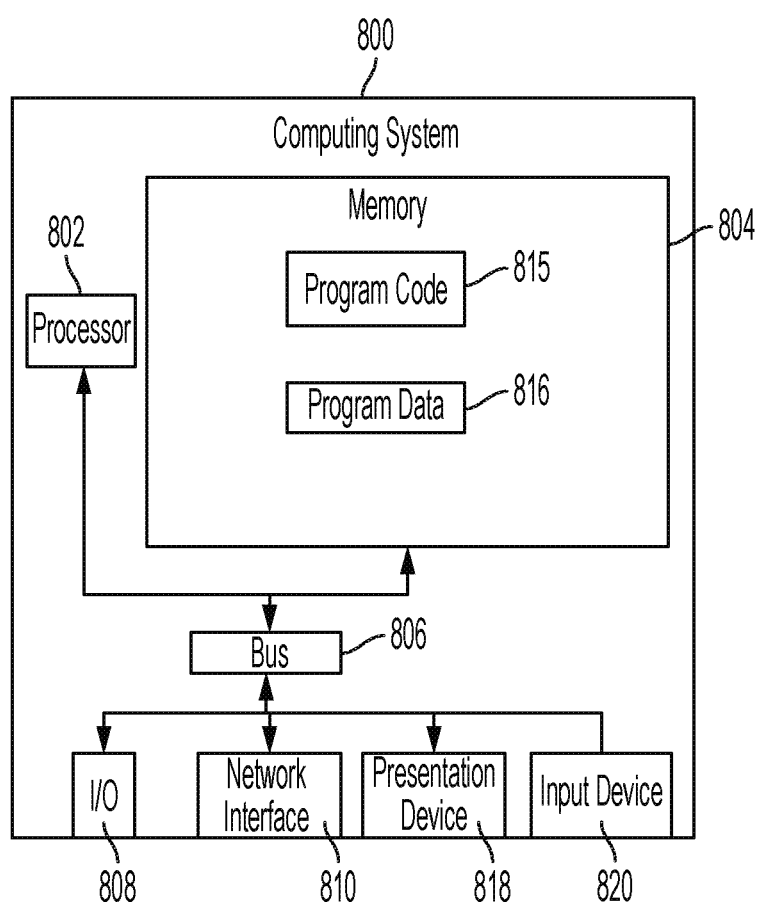
FIG. 8 depicts an example of a computing system for implementing certain embodiments of the present disclosure.

Any suitable computing system or group of computing systems can be used for performing the operations described herein. For example, FIG. 8 depicts an example of the computing system 800. The implementation of computing system 800 could be used for one or more of an environment evaluation system 102, a host system 112, and a training system 120. In other embodiments, a single computing system 800 having devices similar to those depicted in FIG. 8 (e.g., a processor, a memory, etc.) combines the one or more operations and data stores depicted as separate systems in FIG. 1.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

A memory device 804 includes any suitable non-transitory computer-readable medium for storing program code 815, program data 816, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, an input device 820, a presentation device 818, or other input or output devices. For example, the computing environment 100 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code 815 that configures the processor 802 to perform one or more of the operations described herein. Examples of the program code 815 include, in various embodiments, modeling algorithms executed by the environment evaluation system 102, the training engine 122, the online platform 114, or other suitable applications that perform one or more operations described herein (e.g., one or more development applications for configuring the online platform 114). The program code may be resident in the memory device 804 or any suitable computer-readable medium and may be executed by the processor 802 or any other suitable processor.

In some embodiments, one or more memory devices 804 stores program data 816 that includes one or more datasets and models described herein. Examples of these datasets include interaction data, experience metrics, training interaction data or historical interaction data, transition importance data, etc. In some embodiments, one or more of data sets, models, and functions are stored in the same memory device (e.g., one of the memory devices 804). In additional or alternative embodiments, one or more of the programs, data sets, models, and functions described herein are stored in different memory devices 804 accessible via a data network.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device executing an environment evaluation system 102) via a data network using the network interface device 810.

In some embodiments, the computing system 800 also includes the input device 820 and the presentation device 818 depicted in FIG. 8. An input device 820 can include any device or group of devices suitable for receiving visual, auditory, or other suitable input that controls or affects the operations of the processor 802. Non-limiting examples of the input device 820 include a touchscreen, a mouse, a keyboard, a microphone, a separate mobile computing device, etc. A presentation device 818 can include any device or group of devices suitable for providing visual, auditory, or other suitable sensory output. Non-limiting examples of the presentation device 818 include a touchscreen, a monitor, a speaker, a separate mobile computing device, etc.

Although FIG. 8 depicts the input device 820 and the presentation device 818 as being local to the computing device that executes the environment evaluation system 102, other implementations are possible. For instance, in some embodiments, one or more of the input device 820 and the presentation device 818 can include a remote client-computing device that communicates with the computing system 800 via the network interface device 810 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for causing an online platform to modify an interactive computing environment based on an interface experience metric, comprising:

identifying, by a processor executing program code instructions, interaction data associated with user interactions, by a set of users via a plurality of user computing devices, with a user interface of the interactive computing environment, wherein each of the user interactions comprise a set of click interactions with interface elements of the online platform over one or more sessions within the online platform;

computing, by the processor executing program code instructions, goal clusters of the interaction data by performing a clustering operation based on sequences of the click interactions of the set of users with the interface elements, wherein the goal clusters represent interaction goals comprising a goal action or a goal interface display of the set of users performing the sequences of the click interactions;

performing, by the processor executing program code instructions, inverse reinforcement learning on the goal clusters to return rewards and policies corresponding to each of the goal clusters;

assigning, by the processor executing program code instructions, additional sequences of the user interactions with the user interface to the goal clusters;

computing, by the processor executing program code instructions, one or more value differentials between a current click state and a projected click state, wherein the value differential is a difference in a base value of the current click state and the projected click state;

computing, by the processor executing program code instructions, interface experience metrics of the additional sequences of the user interactions with the user interface using the one or more value differentials between the current click state and the projected click state, the rewards, and the policies corresponding to the goal clusters of the additional sequences; and transmitting, by the processor executing program code instructions, the interface experience metrics to the online platform, wherein the interface experience metrics are usable for changing arrangements of interface elements to improve the interface experience metrics.

2. The method of claim 1, wherein the clustering operation comprises an n-gram clustering operation.

3. The method of claim 1, wherein computing the goal clusters of the interaction data is further based on time spent in interaction states associated with each of the user interactions.

4. The method of claim 1, wherein the user interactions comprise interactions on a website, interactions within a local software program of a computing device, interactions associated with generating a user profile on a website or within a local software program, or any combination thereof.

5. The method of claim 1, wherein identifying the interaction data comprises:
identifying, by the processor executing program code instructions, the interaction data comprising survey data indicating a positive user experience rating.

6. The method of claim 1, wherein performing the inverse reinforcement learning on the goal clusters comprises solving a linear programming problem to train trainable parameters of the rewards and to obtain the rewards corresponding to each of the goal clusters.

7. The method of claim 1, wherein assigning the additional sequences to the goal clusters comprises assigning the additional sequences to the goal clusters having a greatest likelihood value and further comprises identifying an interaction goal of the additional sequences.

8. The method of claim 1, further comprising:
transmitting messages and offers to a user associated with one interface experience metric of the interface experience metrics based on the one interface experience metric.

9. A computing system comprising:
means for identifying interaction data associated with user interactions, by a set of users via a plurality of user computing devices, with a user interface of an interactive computing environment, wherein each of the user interactions comprise a set of click interactions with interface elements of an online platform over one or more sessions within the online platform;
means for computing goal clusters of the interaction data by performing a clustering operation based on sequences of the click interactions of the set of users with the interface elements, wherein the goal clusters represent interaction goals comprising a goal action or a goal interface display of the set of users performing the sequences of the click interactions;
means for performing inverse reinforcement learning on the goal clusters to return rewards and policies corresponding to each of the goal clusters;
means for assigning additional sequences of the user interactions with the user interface to the goal clusters;
means for computing one or more value differentials between a current click state and a projected click state, wherein the value differential is a difference in a base value of the current click state and the projected click state;
means for computing interface experience metrics of the additional sequences of the user interactions with the user interface using the one or more value differentials between the current click state and the projected click state, the rewards, and the policies corresponding to the goal clusters of the additional sequences; and
means for transmitting the interface experience metrics to the online platform, wherein the interface experience metrics are usable for changing arrangements of interface elements to improve the interface experience metrics.

10. The computing system of claim 9, wherein the clustering operation comprises an n-gram clustering operation.

11. The computing system of claim 9, wherein computing the goal clusters of the interaction data is further based on time spent in interaction states associated with each of the user interactions.

12. The computing system of claim 9, wherein the user interactions comprise interactions on a website, interactions within a local software program of a computing device, interactions associated with generating a user profile on a website or within a local software program, or any combination thereof.

13. The computing system of claim 9, wherein the means for identifying the interaction data comprises:
means for identifying the interaction data comprising survey data indicating a positive user experience rating.

14. The computing system of claim 9, wherein means for performing the inverse reinforcement learning on the goal clusters comprises:
means for solving a linear programming problem to train trainable parameters of the rewards and to obtain the rewards corresponding to each of the goal clusters.

15. A non-transitory computer-readable medium having program code that is stored thereon, the program code executable by one or more processing devices for performing operations comprising:
identifying interaction data associated with user interactions, by a set of users via a plurality of user computing devices, with a user interface of an interactive computing environment, wherein each of the user interactions comprise a set of click interactions with interface elements of an online platform over one or more sessions within the online platform;
computing goal clusters of the interaction data by performing a clustering operation based on sequences of the click interactions of the set of users with the interface elements, wherein the goal clusters represent interaction goals comprising a goal action or a goal interface display of a set of users performing the sequences of the click interactions;
performing inverse reinforcement learning on the goal clusters to return rewards and policies corresponding to each of the goal clusters;
assigning additional sequences of the user interactions with the user interface to the goal clusters;
computing one or more value differentials between a current click state and a projected click state, wherein the value differential is a difference in a base value of the current click state and the projected click state;
computing interface experience metrics of the additional sequences of the user interactions with the user interface using the one or more value differentials between the current click state and the projected click state, the rewards and the policies corresponding to the goal clusters of the additional sequences; and
transmitting the interface experience metrics to the online platform, wherein the interface experience metrics are usable for changing arrangements of interface elements to improve the interface experience metrics.

16. The non-transitory computer-readable medium of claim 15, wherein the clustering operation comprises an n-gram clustering operation.

17. The non-transitory computer-readable medium of claim 15, wherein the operation of computing the goal clusters of the interaction data is further based on time spent in interaction states associated with each of the user interactions.

18. The non-transitory computer-readable medium of claim 15, wherein the user interactions comprise interactions on a website, interactions within a local software program of a computing device, interactions associated with generating a user profile on a website or within a local software program, or any combination thereof.

19. The non-transitory computer-readable medium of claim 15, wherein the operation of assigning the additional sequences to the goal clusters comprises assigning the additional sequences to the goal clusters having a greatest likelihood value and further comprises identifying an interaction goal of the additional sequences.

20. The non-transitory computer-readable medium of claim 15, wherein the one or more processing devices perform operations further comprising:
   transmitting messages and offers to a user associated with one interface experience metric of the interface experience metrics based on the one interface experience metric.

* * * * *